3,351,631
RECOVERY AND FRACTIONATION OF
COMPLEX ACIDS
Theodore H. Szawlowski, Wonder Lake, and Robert C. Kimble, Crystal Lake, Ill., assignors, by mesne assignments, to Union Oil Company of California, Los Angeles, Calif., a corporation of California
No Drawing. Filed Dec. 2, 1963, Ser. No. 327,492
13 Claims. (Cl. 260—327)

ABSTRACT OF THE DISCLOSURE

Complex acids some of which may be used as stabilizers for DDT, are recovered by repeated precipitation with $C_5$–$C_{10}$ alkanes; $C_5$–$C_7$ isoalkanes and $C_5$–$C_7$ cycloalkanes.

This invention relates to a process of the simultaneous recovery and fractionation of complex acid mixtures derived from sulfur-containing aromatic compounds of petroleum origin and to the the acid fractions so obtained. More particularly, this invention relates to a method of recovery and fractionation, accomplished at the same time, of the mixed alkali metal salts of mono-, di- and polycarboxylic acids, resulting from the metalation and carbonation of aromatic compounds of petroleum origin. The steps involved are (1) Mechanical separation of unreacted alkali metal from the reaction mixture, (2) Concentration of the resulting solution of solvent, unreacted aromatics and alkali metal salts to achieve at least a 50% reduction in volume, (3) Sequential or mass dilution of the resulting concentrate with an anti-solvent for the alkali metal salts, and (4) Recovery of a final fraction by use of said anti-solvent and a trace of water (about 0.2 to 0.5 vol. percent based on the amount of anti-solvent added in the last step).

The complex salt mixtures to be treated by the method of this invention contain salts of acids having individual and characteristic properties, i.e., acid numbers, molecular weights, and varying number of carboxyl groups, making them particularly useful as anti-static agents, as grease components or for the preparation of free acids, or derivatives of the acids, such as amides, aminoamides polyesters, monomeric esters, having utilities as resins, coatings and additives for various compositions, and the like. These utilities are over and above the usefulness of the mixture per se and accordingly it is highly desirable that an effective, economical and easily applied method be found which accomplishes these results.

The method of this invention represents an improvement over and departure from the methods described in copending applications Ser. Nos. 161,355, filed Dec. 22, 1961, now Patent No. 3,228,963; 209,741, filed July 13, 1962, now abandoned; 209,780, filed July 13, 1962, now Patent No. 3,180,876; and 247,358, filed Dec. 26, 1962, now Patent No. 3,250,786; with the exception, like application Serial No. 247,358, that it is limited to the treatment of mixtures of salts of complex carboxylic acids derived from sulfur-containing aromatic compounds of petroleum origin and the methods of the first three copending applications can be applied to acid mixtures from other sources. Furthermore, the method of this invention has certain unobvious advantages over said prior methods to include the facts that unreacted alkali metal is recovered for reuse and not destroyed, the time involved in carrying out the separation is shortened, a unique last step using small amounts of water allows the separation of a fraction heretofore overlooked or lost; and the method, being rapid, can be used as a spot check or control analysis to determine the progress of the metalation and carbonation steps during pilot plant or industrial runs for control purposes.

Still another advantage and feature of this invention is that previous processes have been directed to the fractionation of acids after they are recovered from the reaction mixture, and after destruction of excess alkali metal, with consequent loss of valuable water-soluble complex polycarboxylic acids, which are quite unexpectedly recovered in the last step of the instant process. The uniqueness of this phase of the process lies in the fact that salts of organic acids, such as nephthenic acids normally are soluble in hydrocarbon solvents and as the acid number of these acids increases they become less soluble therein. In the instant process the alkali metal salts of the higher-acid-number acids are difficult to dissolve in the solvent used in the process and also in the unreacted oil and it was found that the low-acid-number salts are soluble in a hydrocarbon solvent and, quite unexpectedly or opposite to other organic acids, they become insoluble just as the hydrocarbon solvent is added. The procedure of this invention results in the separation of a high-acid-number polycarboxylic acid salt in the last step by the incorporation of a small amount of water. This acid fraction has heretofore been undectected.

Accordingly, it becomes a primary object of this invention to provide a process for separating complex acid mixtures, derived from sulfur-containing aromatic compounds or petroleum origin, into fractions of different acid number.

Another object is to provide new fractions of said acids, prepared by the method of this invention.

Still another object is to provide a process of separating mixtures of complex mono-, di- and polycarboxylic acids derived from solvent extracts, hydrogenated solvent extracts, FCC recycle stocks, and decant oil from the FCC process into fractions which are predominantly monocarboxylic, and fractions which are predominantly di- and polycarboxylic in character.

Still another object of this invention is to provide a combination process for the simultaneous recovery and purification or fractionation of complex acids derived from sulfur-containing complex aromatic compounds of petroleum origin.

These and other objects of this invention will be described or become apparent as the specification proceeds.

Briefly, in a specific aspect of this invention, the reaction mixture to be treated results from metalation:

(1)                        (THF)

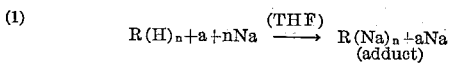

are carbonation reactions:

(2) 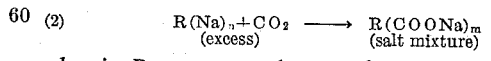

wherein R represents the complex, polycyclic aromatic, heterocyclic nucleus from a petroleum hydrocarbon, such as solvent extracts and other feed materials hereinafter defined, $n$ is the number of replaced hydrogen atoms, $a$ is the amount of excess sodium and $m$ is an integer of 1 to 7 representing a mixture of such salts. This mixture, in an active ether solvent (tetrahydrofuran, THF), contains unreacted sodium, unreacted starting material and intermediate products. In accordance with this invention, this mixture, immediately after the carbonation reaction and cooling to room temperature, is treated by the following steps:

(1) Centrifuging (or settling out by gravity) to remove unreacted sodium at room temperature to produce a THF solution of the balance of the ingredients;

(2) Concentrating the THF solution (as by stripping or distillation) to recover the major portion of THF until a reduction in volume is achieved of at least about 50% and preferably about 60% to 65% or 70%, i.e., 200 ml. reduced to 70-80 ml., to form a concentrate;

(3) Diluting the concentrate with n-heptane (or other solvent in which the sodium salts are insoluble) in successive stages, depending on the number of fractions desired and the fineness of separation sought, e.g., 4 to 10 successive treats to give 4 to 10 separate fractions; and (4) Treating the final solution to the combined influence of n-heptane containing about 0.2 to 0.5% by volume of water to recover the uniquely water soluble sodium salts.

The separate fractions of complex acid salts can be used as such or converted to free acid form by acidification using known techniques as described in said copending applications. Before referring to specific examples illustrating the process of this invention, a description of the source of the complex salt mixture is presented.

*The starting material*

The starting material, $R(H)_n$ of Equation 1, for the reaction to prepare the complex salts or free acids may be any complex, polynuclear, and/or heterocyclic aromatic hydrocarbon from petroleum sources. A preferred and unique source of aromatic starting material comprises petroleum fractions as herein defined, not only because the mono-, di-, and polybasic acid products therefrom have unique properties, but also because the techniques outlined herein are particularly adapted to processing these more complex acid mixtures.

The preferred source of complex hydrocarbons comprises the solvent extracts obtained in solvent-refining mineral oils, particularly lubricating oil fractions, using a solvent selective for aromatic compounds.

Since the general process of refining mineral lubricating oils in which solvent extracts are obtained is well known, and is related in detail in said copending applications, it is only necessary for present purposes to give some examples by way of illustration. Following are the physical characteristics of typical extract products, from lubricating oil stocks derived from various crude oils and other source hydrocarbon materials, which may be used to prepare the complex salt or free acid mixtures separated in accordance with this invention.

TABLE I.—SOURCES AND PHYSICAL CHARACTERISTICS OF SOLVENT EXTRACTS

| Ext. No. | Crude Source | Solvent | API Grav. | Sp. Gr. at 10° F. | Vis./100° F. | Vis./130° F. | Vis./210° F. | V.I. | Pour | °F. Flash | °F. Fire | Iodine No. (Wijs) | Percent C.R. | Percent Sulfur |
|---|---|---|---|---|---|---|---|---|---|---|---|---|---|---|
| 1 | East Tex | Phenol | 11.1 | | 23,319 | 4,750 | 282 | −40 | +55 | | | | 7.2 | 2.60 |
| 2 | do | do | 15.4 | | 15,000 | | 285 | +39 | | | | | | |
| 3 | do | do | 12.6 | | 36,410 | 4,310 | 310.1 | −1 | +80 | | | | 4.7 | 2.27 |
| 4 | do | do | 14.6 | | 19,500 | 4,305 | 313 | +27 | +90 | | | | 4.7 | 2.2 |
| 5 | do | do | 15.4 | | 32,500 | | 372 | +5 | +60 | | | | 4.13 | 2.33 |
| 6 | do | do | 13.7 | | 25,000 | 5,400 | 355 | +27 | +80 | | | | | 2.18 |
| 7 | do | do | 8.6 | | 145,000 | 19,000 | 616 | 0 | +70 | | | | | |
| 8 | do | do | 10.5 | | 12,676 | 2,514 | 172.1 | −101 | +60 | | | | | 2.18 |
| 9 | Santa Fe Springs | do | 10.2 | 0.9984 | | | 371 | | +65 | 520 | 600 | 69.4 | | |
| 10 | Texas | Furfural | 13.0 | 0.9791 | | | 1,500 | | +85 | 470 | 515 | 57.4 | | |
| 11 | Penn | Chlorex | 12.2 | 0.9843 | | | 1,365 | | +85 | 560 | 630 | 71.4 | | |
| 12 | do | Nitrobenzene | 10.0 | 1.000 | | | 1,500 | | +75 | 555 | 640 | 60 | | |
| 13 | Mid-Cont | Propane cresol | 14.4 | 0.9699 | | | 1,500 | | +100 | 540 | 605 | 63.7 | | |
| 14 | do | Phenol | 13.6 | | | | 41.7 | −82 | +20 | | | | | |
| 15 | do | Chlorex | 13.6 | | | | 200 | −61 | +75 | | | | | |
| 16 | do | Phenol | 8.9 | | | | 569 | | +75 | | | | | |
| 17 | do | Furfural | 14.9 | | | | 50.2 | 25 | +20 | | | | | |
| 18 | East Tex | Phenol | 13.5 | .976 | 25,000 | | 341 | 17 | +65 | 530 | 610 | | 5.76 | 2.36 |
| 19 | do | do | 11.1 | | | | 61.5 | −56 | +40 | 435 | 475 | | 0.42 | 2.7 |
| 20 | do | do | 13.7 | | | | 360 | +25 | +65 | 550 | 630 | | 5.5 | 2.3 |
| 21 | do | do | 7.7 | | | | 71.1 | −128 | +35 | 420 | 495 | | 0.86 | 3.2 |
| 22 | do | do | 7.3 | | | | 796 | −76 | +65 | 520 | 610 | | 7.7 | 3.0 |
| 41 | do | do | 17.6 | | 154 | 80 | 41 | 11 | +30 | 400 | 435 | | 0.1 | 2.0 |
| 42 | do | do | 13.7 | | 26,000 | 5,615 | 360 | +25 | +65 | 550 | 630 | 37.5 | 5.5 | 2.3 |
| 43 | do | do | 11.1 | | 1,054 | 331 | 61.5 | −56 | +40 | 435 | 475 | 40.0 | 0.4 | 2.7 |
| 44 | do | do | 7.7 | | 2,007 | 611 | 71.1 | −128 | +35 | 420 | 495 | 38.6 | 0.86 | 3.2 |
| 45 | do | do | 7.3 | 1.019 | 230,000 | 20,800 | 796 | −76 | +65 | 520 | 610 | | 7.7 | 3.0 |

Extract No. 41 was obtained in the production of 85 Vis. neutral, has an average molecular weight of 300, and contained 76.8% aromatics (by the silica gel procedure).
Extract No. 42 was obtained in the production of 150 Vis. Bright Stock, has an average molecular weight of 590, contained 86% aromatics, 14% saturates, analyzed 86.2% carbon, 11.4% hydrogen and averaged 3.3 aromatic rings per aromatic molecule.
Extract No. 43 was obtained in the production of 170 Vis. neutral, has an average molecular weight of 340, contained 84.1% aromatics, 15.9% saturates, analyzed 86.4% carbon, 10.7% hydrogen, and averaged 2.7 aromatic rings per aromatic molecule.
Extract No. 44 was obtained in the production of 200 Vis. neutral, has an average molecular weight of 340 and contained 87% aromatics and 13% saturates.
Extract No. 45 was obtained in the production of 160 Vis. Bright Stock and contained 92% aromatics and 8% saturates.

The solvent extracts from lubricating oils used as starting materials to prepare salt mixtures separable in accordance with this invention have the following general properties and characteristics:

TABLE II

| Characteristic: | Range of value |
|---|---|
| Gravity, ° API | 7.3–18.3 |
| Gravity, sp., 60/60° F. | 0.945–1.022 |
| Viscosity SUS at 210° F. | 40–1500 |
| Viscosity index | −128–+39 |
| Pour point (max.), ° F. | +35–+100 |
| Molecular weight, average (above 300) | 320–750 |
| Boiling point (initial), ° F. | 300–1000 |
| Boiling point (end), ° F. | 400–1200 |
| Sulfur, percent wt. (total) | 0.5–4.5 |
| Sulfur compounds percent by vol. | 20–50 |
| Aromatic compounds | 25–90 |
| Neutral aromatic hydrocarbons | 40–51 |
| Av. No. of rings/means arom. mol. | 1.7–5.0 |

In characterizing the complex salts which may be separated by the method of this invention, the molecular weigths, sulfur content and average number of aromatic rings per mean aromatic molecule are the selected criterion.

The complexity of the types of nuclei present in the salts and finished acids is illustrated by the following table:

TABLE III.—ESTIMATED CHEMICAL COMPOSITION OF SOLVENT EXTRACTS NOS. 19, 21, 43 AND 44 OF TABLE I

| Type of compound: | Approx. percent in the extract |
|---|---|
| Saturated hydrocarbons | 12.5 |
| Mononuclear aromatics: | |
|    Substituted benzenes | 25.0 |
| Dinuclear aromatics: | |
|    Substituted naphthalenes | 30.0 |
| Trinuclear aromatics: | |
|    Substituted phenanthrenes | 10.0 |
|    Substituted anthracenes | 5.0 |
| Tetranuclear aromatics: | |
|    Substituted chrysenes | 0.5 |
|    Substituted benzphenanthrenes | 0.2 |
|    Substituted pyrenes | 0.2 |
| Pentanuclear aromatics: | |
|    Perylene | 0.01 |
| Sulfur compounds [1], oxygen compounds, etc. | 16.5 |

[1] Mainly heterocyclic compounds. The average mol. wt. of Extracts 19 and 21 is 340, and that of Extract 20 is 590.

Any portion of the reactive aromatic constituents in solvent extracts may be isolated therefrom, or from other sources, to be used as starting materials for the preparation of salt mixtures seaparable in accordance with this invention. For example, solvent extracts may be distilled and selected fractions used as the starting materials. The content of reactive, complex, polynuclear, aromatic compounds and heterocyclics present in solvent extracts, as illustrating the preferred source material may vary depending on the type of solvent, the extraction process applied, and the mineral oil treated, although the general types of compounds present in the extract are not so varied. Extracts containing from about 30% to 90% of polynuclear aromatics and heterocyclics of aromatic nature represent a preferred type of starting material for economic reasons.

The solvent extract starting material may be vacuum-distilled, dewaxed and/or clay-contacted and/or hydrogenated prior to use in preparing the complex carboxylic salts separated in accordance with this invention. Dewaxing can be accomplished by known methods, e.g., treatment with 45% MEK and 55% toluene as the dewaxing solvent, using temperatures in the order of −10° F., and solvent/solvent extract ratios of about 8/1. Treatment of one particular extract oil resulted in a dewaxed extract which had a pour point of +5° F. and resulted in the removal of about 2% wax having a melting point of about 130° F. Clay-containing can be accomplished by known methods.

The preparation of hydrogenated extracts is accomplished using known methods of hydrogenation, particularly mild hydrogenation; thus a preferred method of preparing hydrogenated extracts is to hydrogenate the distillate lube oil or residual oil before the extraction by treatment with hydrogen at 100–50 p.s.i.g. using temperatures of 530–600° F. in the presence of a molybdena-silicia-alumina catalyst. This same method can be applied to the solvent extracts per se, that is, after separation from the raffinate.

Hydrogenation has been found to result in the decarboxylation of any naphthenic acids present and the production of an extract from which complex acids of enhanced properties can be obtained by metalation, carbonation, acidification and fractionation.

Other known methods of hydrogenation can be applied to the solvent extracts using such catalysts as Filtrol, cobalt-molybdate, silver-molybdate and Porocel. The characteristics of a representative hydrogenated dewaxed and clay-contacted solvent extract are ° API, 9.5; color, NPA, 7; flash (COC), 420° F.; fire (COC), 465° F.; pour point, −5° F.; vis. at 100° F., 1075 SUS; vis. at 210° F., 58.5 SUS; V.I., 96; Neut. No. (1948), 0.05; sulfur, 2.60 wt. percent and C.R. percent, 0.01. The FCC recycle stock is illustrated by the 19% extract (phenol solvent) of FCC recycle stock, which extract had the following properties: ° API, 1.8; sulfur, 1.9 wt. percent; Br. No. 17; R.I. (20° C.) 1.6372, and Engler Distillation, IBP=589° F., 90%—745° F. The use of these latter starting materials is described in copending application Ser. No. 79,661, now Patent No. 3,153,087.

The catalytic cracking of those fractions of crude petroleum oils between diesel burning oil and vacuum residuals furnishes sources of complex, high-molecular-weight polynuclear aromatic and heterocyclic compounds utilizable as alternate feed materials for the preparation of the complex carboxylic salt mixtures to be separated in accordance with this invention. The Orthoflow Fluid Catalytic Cracking process of the M. W. Kellogg Co. is illustrative wherein any of the heaviest virgin gas oils that do not contain excessive heavy metal contents (which cause catalyst poisoning) are treated to fluid catalytic cracking to produce gasoline, heating oils, heavy fuel oils and fuel gas. During the process at least two by-product streams are produced which are sources of complex polynuclear aromatic sulfur-containing compounds that can be utilized in accordance with this invention, namely, the FCC cycle stock (or so-called heavy gas oil) and the decant oil. The preparation of these by-product streams is illustrated as follows, said description is not to be construed as limiting and it is to be understood that other catalytic cracking processes can be used to produce similar by-product streams.

In a typical operation, mixed reduced crudes and several virgin gas oil streams comprising as many as 12 different feed components such as light vacuum distillates and heavy vacuum distillates, from FCC feed preparation units, solvent extracts from the preparation of neutral and light stock lubricating oils (as herein defined) and heavy virgin distillates, i.e., heavy gas oils from the distillation of crude oils, in an amount of about 23,750 b.p.s.d., is preheated by exchange and sent to the Orthoflow converter equipped with reaction, catalyst stripping, air regeneration and catalyst circulation facilities. The cracked hydrocarbon vapors, steam and inert gas are sent to the base of a fractionator tower wherein the vapors are cooled and washed free of catalyst. Sufficient cooling is accomplished by the circulation of bottoms reflux over baffles, and by downflow from the tray above, to disuperheat the entering material and to condense the slurry recycle and decanted oil. Heat recovered from the tower by the slurry reflux is used for reboiling in the recovery and catalytic polymerization sections, for preheating fresh feed and for the generation of steam in a waste heat boiler.

The slurry settler in the base of the fractionator, separated therefrom by a solid internal head, is fed by the slurry reflux pump. Decanted oil is recycled to the base of the fractionator in order to maintain a low concentration of catalyst in the slurry reflux. The net decanted oil flows through a cooler and is pumped to storage while the thickened slurry flows into the stream of recycle gas oil returning to the reactor inlet. Both a light gas oil (herein referred to as light FCC recycle stock) and a heavy gas oil (herein referred to as a heavy FCC recycle stock) are withdrawn at appropriate trays of the fractionator. The tray between the top of the scrubbing section and the heavy FCC cycle stock drawoff pan removes any entrained slurry reflux or catalyst that may carry over. Above this tray the total drawoff pan collects the heavy FCC cycle stock for removal from the tower and recycle to the reactor and as reflux to the tower. A portion of this stream after cooling, is sent to storage. Light gas oil product, lean oil, gland oil, overhead vapors and gas streams are recovered in the upper sections of the tower, and separately processed, i.e., the gas from the process is compressed and subjected to catalytic polymerization. The 23,750 b.p.s.d. of feed produces about 11,506 b.p.s.d. of gasoline, 2,381 b.p.s.d. of heating, 8,944 b.p.s.d. of heavy fuel oil and 1,263 b.p.s.d. of fuel gas.

In the treatment of 17,750 b.p.s.d. of fresh feed comprising distillates using a synthetic cracking catalyst at 900° F., 70% conversion at 1.5 throughput ratio (total charge divided by fresh feed) about 2,840 b.p.s.d. of $C_4$ hydrocarbons, 8,700 b.p.s.d. of $C_5$–400° gasoline, 4,438 b.p.s.d. of 400–600° light FCC cycle stock and 887 b.p.s.d. of decant oil is produced. The catalyst is a silica-alumina fluid cracking catalyst.

To illustrate, 17,004 b.p.s.d. of fresh feed and 4,253 b.p.s.d. of vacuum heavy gas oil from the vacuum tower (total 21,257 b.p.s.d.) is subjected to fluid catalytic cracking at about 900–880° F. using a standard cracking catalyst at a catalyst to oil ratio of about 8.4/1, space velocity of about 2.4 to produce 4,152 b.p.s.d. of light catalytic distillate, 7,516 b.p.s.d. of heavy gas oil recycle, 1,920 b.p.s.d. of decanted oil and 497 b.p.s.d. of net slurry recycle. The characteristics of the heavy cracked gas oil and decanted oil are shown in the following table.

TABLE IV.—PRODUCT CHARACTERISTICS

|  | Heavy FCC Recycle Stock | | Decanted Oil | |
| --- | --- | --- | --- | --- |
|  | No. 1 | No. 2 | No. 1 | No. 2 |
| Distillation: | | | | |
| ASTM D–1160 at 10 mm.: | | | | |
| IBP, ° F | 151 | 173 | 177 | 198 |
| 5% | 299 | 305 | 351 | 346 |
| 50% | 368 | 369 | 455 | 449 |
| 95% | 429 | 433 | 644 | 645 |
| EP | 484 | 481 | 680 | 663 |
| ASTM D–1160 at 760 mm.: | | | | |
| IBP, ° F | 367 | 394 | 399 | 425 |
| 5% | 549 | 556 | 611 | 605 |
| 50% | 632 | 633 | 734 | 727 |
| 95% | 734 | 740 | 949 | 950 |
| EP | 767 | 767 | 989 | 970 |
| ASTM D–158: | | | | |
| IBP, ° F | 479 | 462 | | |
| 50% | 616 | 618 | | |
| EP | 712 | 712 | | |
| Viscosity, Cs at— | | | | |
| 100° F | 6.16 | 6.16 | *22.0 | *22.7 |
| 130° F | 4.04 | 4.05 | 11.73 | 11.87 |
| 210° F | 1.88 | 1.89 | 2.74 | 3.76 |
| RI at 67° C | 1.4958 | 1.4965 | 1.5525 | 1.5520 |
| Pour Point, ° F | +50 | +50 | +80 | +80 |
| Sulfur, wt. percent | 0.59 | 0.59 | 0.97 | 0.90 |
| Nitrogen, wt. percent | 0.02 | 0.02 | 0.03 | 0.03 |
| CR | 0.14 | 0.14 | 1.62 | 1.67 |
| Bromine No | 2.8 | 2.7 | 7.9 | 8.0 |
| Aniline Point: | | | | |
| ° F | 155.0 | 154.0 | 154.0 | 153.0 |
| ° API | 26.2 | 25.7 | 14.8 | 14.6 |

* Extrapolated values.
The catalyst used in these experiments was a silica-alumina fluid cracking catalyst.

Another typical example of an FCC decant oil is one having an API gravity of 15.4°, IBP 375° F., and EP 955° F., at atmospheric pressure; cs. vis. at 100° F. 21.00; cs. vis. at 210° F., 3.66; percent S, 0.870; Ramsbottom C, 1.70; mol. wt. 320; vis. gr. con., .945; Br. No. 8.0. The 47 vol. percent extract from this decant oil has a specific gravity of 1.095, exhibits the same initial boiling point and end boiling point and has the following characteristics: cs. vis. at 100° F., 223.5; cs. vis. at 210° F., 7.80; percent S, 1.44; Ramsbottom C, 5.7; vis. gr. con., 1.103; Br. No. 14.0, which is another species of the starting material.

The heavy cracked gas oil or heavy FCC cycle stock and decanted oil products above are illustrative of sources of complex high-molecular-weight polynuclear aromatic compounds to be used to prepare complex carboxylic salts from which fractions are separated in accordance with this invention. These feed sources can be treated in a manner to increase the aromaticity or extract the complex aromatic compounds therefrom, for use in the metalation reaction, i.e., by solvent extraction with the known solvents (described herein) for this purpose.

TABLE V.—HYDROGENATION OF SOLVENT EXTRACTS AND PRODUCTS

| | Reaction Conditions | | | | | | | | | |
| --- | --- | --- | --- | --- | --- | --- | --- | --- | --- | --- |
| | Run No. | | | | | | | | | Range of Conditions and Product Properties |
| | 1 | 2 | 3 | 4 | 5 | 6 | 7 | 8 | 9 | |
| Extract No | 43 | 44 | 44 | 44 | 41 | 43 | ¹43 | 44 | ¹44 | |
| H/HC ratio | 2.0 | 2.0 | 2.5 | 2.5 | 1.75 | 1.03 | 2.0 | 2.0 | 2.02 | 1.0–2.5 |
| LVHSV | 2.15 | 2.05 | 2.0 | 1.95 | 2.0 | 2.0 | 2.0 | 1.97 | 2.0 | 1.9–2.5 |
| Temp., ° F | 700 | 7.0 | 650 | 650 | 650 | 675 | 700 | 700 | 720 | 650–720 |
| Pressure, p.s.i.g | 500 | 500 | 400 | 300 | 400 | 400 | 500 | 500 | 500 | 300–500 |
| Catalyst | (²) | (²) | (²) | (²) | (²) | (²) | (²) | (²) | (²) | (²) |
| Products: | | | | | | | | | | |
| Neut. No | 0.13 | 0.14 | 0.52 | 0.96 | 0.11 | 0.66 | 0.24 | 0.08 | 0.15 | 0.8–1.0 |
| Sulfur (wt. percent) | 2.4 | 3.19 | 3.07 | 3.05 | 1.75 | 2.6 | 2.6 | 2.7 | 2.7 | 1.5–3.5 |
| Grav., ° API | 12.8 | 9.4 | 8.5 | 8.8 | 18.5 | 11.8 | 12.9 | 10.1 | 9.7 | 8.0–15.0 |
| Vis at 100° F | 663.7 | 1,133 | 1,457 | 1,452 | 132.5 | 808.7 | 851.1 | 464 | 1,058 | 450–1,500 |
| VI | −33 | −96 | −115 | −114 | −9 | −49 | −52 | −83 | −96 | −120—−9 |

¹ Dewaxed.  ² Filtrol.

For the FCC recycle stock this is illustrated by the 19% extract (phenol solvent) thereof, which extract had the following properties: °API, 1.8; sulfur, 1.9 wt. percent; Br. No. 17; RI (20° C.), 1.6372, and Engler Distillation, IBP=589° F.; 90%—745° F. The use of these latter starting materials is described in copending application Serial No. 79,661.

The results of hydrogenation of several of the solvent extracts shown in Table I to produce hydrogenated or dewaxed and hydrogenated solvent extracts as starting materials for the preparation of the complex acid mixture and subsequent acid fractionation are shown in Table V.

Table V also sets forth the range of conditions and product properties that are generally applicable in the preparation of hydrogenated solvent extracts as starting materials in the preparation of the salts of complex acids to be separated in accordance with this invention. The fractionated salts can be transformed to the free acid form by treatment with a mineral acid, e.g., hydrochloric, nitric, sulfuric acid, as disclosed in said copending applications to form the final product.

Without limiting the invention, the charateristics of the products of this invention as influenced by the complex acids are further disclosed as thus far evaluated. The salts are mixtures of salts of mono-, di- and polycarboxylic acids of the dihydronaphthalene, dihydrophenanthrene, and dihydroanthracene types, having several alkyl groups and/or cycloalkyl groups in each aromatic nucleus wherein the sum of the carbon atoms in the alkyl or naphthenic radical varies between 5 to 22. Despite the size of the acid molecules, the linkages through or between the carboxyl groups are about the same as those of phthalic and terephthalic acids. A portion of the aromatic rings or condensed aromatic rings are probably further condensed with naphthenic rings to form configurations similar to the steroid ring systems. Extract acids from solvent extracts obtained in the production of bright stocks probably contain more highly condensed aromatic structures.

Most of the sulfur is in the form heterocyclic rings with carbon associated with both the aromatic-type and naphthenic-type structures present. Only trace amounts of the sulfur are present as high-molecular-weight aliphatic sulfides. The nitrogen content of distilled solvent extracts is 0.01 to 0.04%. Analysis for the types of carbon linkages as percent $C_a$ (carbon atoms in aromatic configuration) percent $C_n$ (carbon atoms in naphthenic configuration) and percent $C_p$ (carbon atoms in paraffinic configuration) gives results ranging from about 30–40% $C_a$, 20–35% $C_n$, and 31–47% $C_p$ using the method of Kutrz, King, Stout, Partikian and Skrabek, (Anal. Chem., 28, 1928 (1956)). They are soluble in ethyl ether, acetone, methyl ethyl ketone, tetrahydrofuran, benzene, toluene and xylene.

*The complex carboxylic acid salt mixtures*

The complex salt mixtures to be treated in accordance with this invention are formed during the metalation and carbonation steps of the process disclosed in copending applications Ser. Nos. 220,344, filed Sept. 1, 1962, now abandoned; 79,661, filed Dec. 30, 1960; and 160,882, filed Dec. 20, 1960, now Patent No. 3,222,137; and the details thereof to include the feed materials, the metalation step and the carbonation reaction are incorporated herein by reference.

In accordance with the therein disclosed processes and the instant process, the starting aromatic material to prepare the salts of the complex, polynuclear, aromatic, alkylaromatic heterocyclic carboxylic acids, by metalation and carbonation, or the free acids by subsequent acidification of selected fractions, comprises any source of such reactive, complex polynuclear compounds of petroleum origin as represented by (1) solvent extracts obtained in the solvent refining of mineral lubricating oils using a solvent selective for aromatic compounds, (2) hydrogenated and refined solvent extracts, (3) FCC recycle stock and (4) decant oil from FCC processing, which source materials have just been described. These source materials rich in complex aromatics and containing heterocyclic (S-, N- and O-containing) rings are subjected to metalation with an excess of alkali metal in a dispersed state to form the alkali metal adduct, particularly in the presence of, or in subsequent addition of an active ether solvent such as THF and the adduct is carbonated, that is, treated with gaseous or solid carbon dioxide at low temperatures. This forms the alkali metal salt of the complex carboxylic acid or mixtures of mono-, di- and polycarboxylic acids having 1 to 7 carboxyl groups per molecule. Each carboxyl group with attached alkali metal forms in the molecule at the site of the attachment to the molecule of the alkali metal during adduct formation. The reaction mixture at this point is the starting mixture for the process of this invention, same also being formed at the end of the metalation and carbonation steps of the copending applications infra.

One procedure is to react about 30 parts of a petroleum fraction rich in complex polynuclear aromatics, as exemplified by solvent extract oils, with 1 to 5 parts of an alkali metal, such as sodium, potassium, cesium, lithium, and rubidium, and their mixtures and amalgams, at a temperature of about $-60°$ to $80°$ C. in the presence of a reaction solvent such as dimethyl glycol ether, dimethyl ether, methylalkyl ethers, dialkyl glycol ethers, tetrahydrofuran, methylal and trimethylamine. Such solvents as dioxane, MEK and diethyl ether may be used, but they do not materially aid the reaction and MEK must be removed before destruction of the excess sodium by water. p-Dioxane being infinitely soluble in water may cause trouble in subsequent purification stages.

The formation of the adduct is promoted by shearing and agitation, providing an excess of alkali metal, using a pre-formed dispersion of the alkali metal in an inert solvent, or using a pre-formed dispersion of the alkali metal in a portion or all of the solvent extract. These techniques overcome the induction period of the reaction caused by impurities, including sulfur compounds, present therein, which tend to coat the alkali-metal particles and prevent the reaction or prolong the induction period. A Brookfield counter-rotating stirrer may be used to give continuous shearing and expose fresh metal surfaces during the reaction. Color changes indicate the progress of the reaction.

The alkali-metal adduct thus formed is either separated or left in the unreacted oil, and the mixture is treated with excess gaseous or solid carbon dioxide at temperatures ranging from about $-20°$ to $80°$ C., causing a discharge of the color. This forms the alkali-metal salt of the complex acid which, upon acidification with a mineral acid, such as sulfuric, nitric or hydrochloric acid, yields the desired complex, polynuclear, carboxylic acids in good yields. To illustrate, the following non-limiting examples are given.

EXAMPLE I

One hundred grams of extract oil No. 19 (Table I) from the preparation of 170 vis., 100 V.I. neutral oil, dissolved in 675 cc. of dry tetrahydrofuran, was reacted with agitation at $10°$ to $30°$ C. with 8.3 g. of metallic sodium in the form of $\frac{3}{16}''$ cubes. After 25 minutes, adduct-formation began and a strong color change took place. The product was cooled to $-60°$ C. while an excess of carbon dioxide gas was introduced, resulting in a discharge of the color without precipitation. The heavy liquid mixture is subjected to settling and about 5.1 g. of unreacted sodium is separated. The THF is vacuum-stripped from the reaction mixture until the total volume is about 390 cc., which liquid residue is treated with 1000 cc. aliquot portions of n-hexane, with thorough agitation and centrifuging and the separation of the precipitated sodium salt fraction. The treatment with n-hexane portions is continued until no more salt fractions are obtained. Then the solute is treated with n-hexane containing about 0.2 to 0.5 volume of water and the remaining salts of the water soluble complex acids are recovered in the aqueous phase.

From an over-all reaction mixture, containing acids (freed by acidification) having an average molecular weight of about 686, a saponification value of 171 and a calculated equivalent weight of about 328 and containing an average of about 2.1 carboxyl groups per molecule, there is obtained a series of individual fractions of salts, which on acidification, produce individual acid fractions of progressively higher acid numbers, varying molecular weights and containing one, two or more than two carboxyl groups per molecule.

EXAMPLE II

One hundred grams of extract oil No. 19 (Table I) and 675 ml. of dry tetrahydrofuran were charged to a one-liter, 3-necked flask equipped with a stirrer, thermometer, pressure-equalized drop-funnel, gas inlet with rotometer, and gas outlet. A dry nitrogen atmosphere was maintained in the flask. Approximately 100 g. of alundum balls, $\frac{5}{16}''$ in diameter, were charged and agitation was started. The solution was cooled to $-20°$ C. and 8.3 g. of sodium were added. After an induction period of about 5 minutes, the solution was warmed, and at $-7°$ C. the reaction began; in 17 minutes it was proceeding rapidly. An excess of dry carbon dioxide was added at $-80°$ C. over a period of 78 minutes. Throughout the whole run, from dispersion to carbonation, every precaution was taken to prevent moisture from entering the reaction flask. The excess sodium is separated by settling and the clear solution is decanted away from the caked sodium. Individual salt fractions and a final fraction of water soluble acids are separated from this reaction mixture in accordance with this invention.

EXAMPLE III

Solvent extract No. 44 of Table I (156.0 g.) and metallic sodium (13.0 g.) were charged to a dispersion flask equipped with a special high-speed mixer, a centigrade thermometer and a nitrogen inlet tube.

The contents were heated to 145° C., with a slow stream of nitrogen gas as a blanket, and dispersed at high speed for 4 minutes. During the dispersion, the maximum temperature reached was 161° C. At the end of this dispersion, the high-speed stirrer was replaced with a slow-speed, regular-blade mixer and the mixture was allowed to cool to room temperature. Then 780 ml. of dried THF were added, and the mixture was stirred and cooled down to −25° for 25 minutes, using a Dry Ice-acetone bath for chilling.

At the end of this 25 min. period, the cold mixture was carbonated by pouring it into a 3-liter flask containing sufficient excess of crushed Dry Ice so that after 5 min. of carbonation there was still some excess Dry Ice in evidence.

Throughout the entire run, from dispersion through carbonation, every precaution was taken to prevent moisture, or humid air, from entering the reaction flask. Presence of moisture would cause a waste of sodium metal and also would cause a waste of sodium metal and also would cause precipitation of sodium salts of petroleum acids from the THF solution.

Directly after carbonation, when the mixture had come to room temperature, it was centrifuged under $N_2$ blanket at 2000–2400 r.p.m. to cause all unreacted sodium to form a solid cake on the bottom of the vessel. The same separation of sodium cake was found to take place if the carbonated mixture was allowed to settle by gravity for 24 hrs. at room temperature with $N_2$ gas blanket kept over the surface.

The clear, brown solution (containing THF, unreacted oil, and the sodium salts of petroleum acids) was carefully decanted, or siphoned off, from the cake of sodium on the bottom. The brown THF solution, containing the salts, was concentrated by heating in a distillation flask under partial vacuum. The excess THF was boiled off and recovered as a condensate in a condenser and cold trap unit. This process of concentration was continued until the original volume of THF solution was reduced from about 100 volume units to between 35–40 volume units.

This concentrated solution (still carefully protected from moisture and air) was subjected to graduated fractionation by diluting with increments of n-heptane as outlined below:

(a) To 70 ml. of concentrate, 200 ml. of n-heptane were added and the mixture was shaken vigorously and then centrifuged for 10 min. at 2000 r.p.m. The supernatant solution was decanted off, and the sodium salts were recovered from the bottom of the centrifuge vessel by water wash. The water solution of salts was treated with concentrated HCl and extracted with ether to recover the free acid in the usual manner. Yield of sodium salts was 14.2 g.; acid number of acid recovered was 97. (Fraction I.)

(b) To the solution from (a) was added 100 ml. of n-heptane, and the mixture was shaken vigorously and centrifuged at 2000. Yield of sodium salt was 0.95 g.; recovered acid=150 A.N. (Fraction II.)

(c) Liquid from step (b) was shaken with 100 ml. of added n-heptane, and the mixture was centrifuged at 2000 r.p.m. Yield of sodium salts was 0.84 g.; recovered acid=160 A.N. (Fraction III.)

(d) Liquid from step (c) was shaken with 200 ml. of added n-heptane, and the mixture was centrifuged at 2000 r.p.m. Yield of sodium salts was 0.24 g.; recovered acid=200 A.N. (Fraction IV.)

(e) Liquid from step (d) was shaken with 100 ml. of added n-heptane and the mixture was centrifuged at 2000 r.p.m. Yield of sodium salts was 0.20 g.; recovered acid=234 A.N. (Fraction V.)

(f) Liquid from step (e) was shaken with 100 ml. added n-heptane plus 0.5 ml. of $H_2O$, and the mixture was centrifuged at 200 r.p.m. Yield of sodium salts was 1.50 g.; recovered acid=250 A.N. (Fraction VI.)

This ended the fractionation.

Aside from the procedural steps outlined herein and their sequence, no particular precautions need be taken in carrying out the method of this invention that are not already recognizable by one skilled in the art. Various means and apparatus are available to carry out and facilitate each step of the process. The mechanical separation of the unreacted alkali metal can take place under conditions wherein the alkali metal is a solid or liquid. This step is preferably carried out at room or ambient temperature for practical reasons.

The use of temperatures above the melting point of the alkali metal facilitates separation, particularly during centrifuging, since the viscosity of the liquid phase reaction mixture is reduced. However, the use of temperatures which require pressurizing the system above about 15 p.s.i. because because of the volatility of the reaction solvent are not as practical as using temperatures below this level. Thus temperatures up to the boiling point of the reaction solvent are practical and in some instances temperatures above this level may be used provided the pressures necessary to maintain a liquid phase do not exceed about 15 p.s.i. The particular conditions used may vary with the type of reaction mixture being treated and the type of reaction solvent.

The anti-solvent used in accordance with this invention may be any inert liquid in which the salts of the complex carboxylic acids are insoluble and which are miscible with the unreacted oil and reaction solvent. For this purpose the anti-solvent must be non-polar, inert, stable and liquid under the conditions used. Examples of anti-solvents are $C_5$ to $C_7$ alkanes (pentane, hexane and heptane), $C_5$ to $C_7$ isoalkanes (isopentane, isohexane and isoheptane) or any mixture of liquid alkanes which are easy to handle at ordinary temperatures, $C_5$ to $C_7$ cycloalkanes (cyclopentane, cyclohexane and cycloheptane), methyl-substituted $C_5$ to $C_7$ cycloalkanes (methyl cyclopentane, methyl cyclohexane and methyl cycloheptane), chlorinated alkanes, butyl ethers, hexyl ethers and higher molecular weight alcohols such as hexyl alcohol, heptyl alcohol and the like. Both as to cost and efficiency, the preferred examples of the anti-solvent are pentane, isopentane, hexane, isohexane, heptane, isohexane and mixtures thereof.

Alkanes having up to 10 carbon atoms per molecule may be used, provided the temperature of treatment is adusted to maintain a liquid phase. Those anti-solvents having iso-configuration, chloro groups, ether groups, or hydroxyl groups should be of high enough mol. wt. so they are essentially non-polar in nature.

In using anti-solvents, like chlorohydrocarbons, which have some polarity, the amounts per incremental addition must be increased in order to effect the desired separation. The same limitation apply to the last step of the process wherein the anti-solvent plus a small amount of water or the small amount of water alone is added to the reaction mixture to separate the remaining water-soluble complex acid salts. Based on the total final volume of the reaction mixture, and depending on the number of previous dilutions with anti-solvent alone which have been made, the amount of water necessary to extract the water soluble salts will be about 0.02 to 0.05 volume percent. Both the anti-solvent and water used are necessarily free of foreign matter or contaminants as is the practice in this art. The proof of the formation of carboxylic acids or their salts in accordance with the over-all process lies in the fact of the nature of the reaction, e.g., using metalation and carbonation to produce same, the acid number of the product and heat stability tests wherein the acid number is reduced and a gaseous product having the nature of carbon dioxide is produced.

The n-heptane used to demonstrate this invention had the following characteristics: B.P. 209.1° F.; sp. gr. 60° F./60° F., 0.688; aniline point, 156.9° F.; and R.I. 1.388. The anti-solvent is kept free of moisture, except where the water-soluble salts are being extracted. This is accomplished by storing in the presence of anhydrous calcium sulfate. The volatiles distilling off during the concentration step comprise the reaction solvent. Thus, the temperature of this step is a function of the boiling point of the reaction solvent. To illustrate, THF is removed at atmospheric pressures by heating the reaction product mixture to a temperature of about 64°–69° F.

In one aspect of this invention, sequential complex aromatic acid fractions are obtained having acid numbers ranging from about 90 to 300 or 97 to 250 as illustrated by the examples, wherein progressively higher acid number fractions are successively removed. Also, the products produced by the process of this invention form an embodiment thereof.

The embodiments of the invention in which an exclusive property or privilege is claimed are defined as follows:

1. In the process of preparing high molecular weight, aromatic, heterocyclic acids from sulfur-containing compounds of petroleum origin by metalation of said complex compounds with an alkali metal to form the alkali metal adduct and carbonation to form the alkali metal salt of the corresponding carboxylic acid, the improvement comprising mechanically separating unreacted alkali metal from the reaction mixture, concentrating the resulting mixture by removal of about 50% by volume of volatiles to form a concentrate of the reaction mixture, precipitating alkali metal salts by adding a non-polar, inert liquid selected from the class consisting of: $C_5$–$C_{10}$ alkanes; $C_5$–$C_7$ isoalkanes and $C_5$–$C_7$ cycloalkanes and recovering the resulting precipitate for conversion to the free acid form.

2. The process in accordance with claim 1 in which the unreacted alkali metal is contrifuged from the reaction mixture.

3. The process in accordance with claim 1 in which the unreacted alkali metal is settled from the reaction mixture.

4. The process in accordance with claim 1 in which the reaction mixture is concentrated by boiling off a portion of those constituents having an end boiling point of up to about 200° C.

5. The process in accordance with claim 4 in which the volatiles comprise the reaction solvent for the reaction mixture.

6. The process in accordance with claim 1 in which the liquid is normal heptane.

7. The process in accordance with claim 1 in which the liquid is normal hexane.

8. The process in accordance with claim 1 in which said liquid is added sequentially, followed by separation of individual fractions of said salts after each addition.

9. The process in accordance with claim 1 in which the residue resulting from the sequential fractionation of the precipitated alkali metal salts is treated with said liquid containing about 0.02 to 0.05 volume percent of water based on the total volume of said mixture to recover a final fraction of said alkali metal salts.

10. The process in accordance with claim 1 in which said sulfur containing organic compound is selected from the group consisting of (1) solvent extract obtained in the solvent extraction of mineral lubricating oils using a solvent selective for aromatic compounds, (2) hydrogenated solvent extracts, (3) FCC recycle stocks, (4) decant oil from FCC processes and (5) mixtures thereof.

11. In the process of preparing high molecular weight, aromatic, heterocyclic acids from sulfur-containing compounds of the group consisting of (1) solvent extract obtained in the solvent extraction of mineral lubricating oils using a solvent selective for aromatic compounds, (2) hydrogenated solvent extracts, (3) FCC recycle stocks, (4) decant oil from FCC processes, and (5) mixtures thereof, by metalation with sodium to form the sodium adduct and carbonation to form the sodium salt of the corresponding carboxylic acid, the improvement comprising mechanically separating unreacted sodium from the reaction mixture, concentrating the resulting mixture by removal of about 50% by volume of reaction solvent to form a concentrate of the reaction mixture, precipitating sodium salts with a non-polar, inert, liquid selected from the class consisting of: $C_5$–$C_{10}$ alkanes; $C_5$–$C_7$ isoalkanes; and $C_5$–$C_7$ cycloalkanes and recovering the resulting precipitate for conversion to the free acid form.

12. The process in accordance with claim 11 in which sequential acid fractions are individually separated, each having an acid number higher than the succeeding fraction, said fractions having acid numbers in the range of about 90 to 300.

13. The process in accordance with claim 12 in which the individual fractions have acid numbers within the range of about 97 to 250.

References Cited
UNITED STATES PATENTS

| | | | |
|---|---|---|---|
| 3,180,876 | 4/1965 | Joo | 260—327 |
| 3,228,963 | 1/1966 | Joo et al. | 260—327 |
| 3,250,785 | 5/1966 | Joo | 260—327 |
| 3,250,786 | 5/1966 | Joo et al. | 260—327 |

JAMES A. PATTEN, *Primary Examiner.*

WALTER A. MODANCE, *Examiner.*